United States Patent
Jebai et al.

(10) Patent No.: US 9,197,152 B2
(45) Date of Patent: Nov. 24, 2015

(54) CONTROL METHOD IMPLEMENTED IN A POWER CONVERTER AND INTENDED FOR IDENTIFYING PARAMETERS LINKED TO THE MAGNETIC SATURATION OF AN ELECTRIC MOTOR

(75) Inventors: Al Kassem Jebai, Cachan (FR); Francois Malrait, Jouy sur Eure (FR); Philippe Martin, Paris (FR); Pierre Rouchon, Meudon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 285 days.

(21) Appl. No.: 14/002,450

(22) PCT Filed: Feb. 29, 2012

(86) PCT No.: PCT/EP2012/053428
§ 371 (c)(1),
(2), (4) Date: Aug. 30, 2013

(87) PCT Pub. No.: WO2012/123255
PCT Pub. Date: Sep. 20, 2012

(65) Prior Publication Data
US 2013/0334992 A1    Dec. 19, 2013

(30) Foreign Application Priority Data

Mar. 11, 2011 (FR) .................................... 11 51997

(51) Int. Cl.
*H02P 21/00* (2006.01)
*H02P 21/14* (2006.01)
(Continued)

(52) U.S. Cl.
CPC ............... *H02P 21/14* (2013.01); *H02P 6/185* (2013.01); *H02P 21/146* (2013.01); *H02P 23/14* (2013.01); *H02P 2203/11* (2013.01)

(58) Field of Classification Search
CPC ............. H02P 21/0035; H02P 25/027; H02P 2203/11; H02P 23/14; H02P 21/141; H02P 25/021; H02P 27/12; H02P 29/0038

USPC .......... 318/400.02, 400.23, 400.26, 722, 503, 318/504
See application file for complete search history.

(56) References Cited

U.S. PATENT DOCUMENTS 4,633,157 A * 12/1986 Streater .......................... 318/723
6,555,988 B2 * 4/2003 Masaki et al. ................. 318/721
(Continued)

FOREIGN PATENT DOCUMENTS

EP        1 492 225        12/2004
EP        2 290 807        3/2011

OTHER PUBLICATIONS

Li, Y. et al., "Improved Rotor Position Estimation by Signal Injection in Brushless AC Motors, Accounting for Cross-Coupling Magnetic Saturation", Industry Applications Conference, 2007.42$^{nd}$ IAS Annual Meeting. Conference Record of the 2007 IEEE, pp. 2357-2364, XP031146247, (Sep. 1, 2007).

(Continued)

*Primary Examiner* — Bentsu Ro
*Assistant Examiner* — Thai Dinh
(74) *Attorney, Agent, or Firm* — Oblon, McClelland, Maier & Neustadt, L.L.P.

(57) ABSTRACT

A control method implemented in a power converter including an inverter connected to a synchronous electric motor including permanent magnets, the electric motor being modeled in the power converter by a mathematical model of currents in the electric motor expressing a flux current and a torque current on the basis of magnetic-saturation parameters. The control method identifies magnetic-saturation parameters during a learning procedure including applying a static voltage signal and a high-frequency voltage signal along an axis of the flux and/or an axis of the torque of the motor to cause an oscillation of the current on the axis of the flux and/or on the axis of the torque.

10 Claims, 6 Drawing Sheets

Figure 2A:
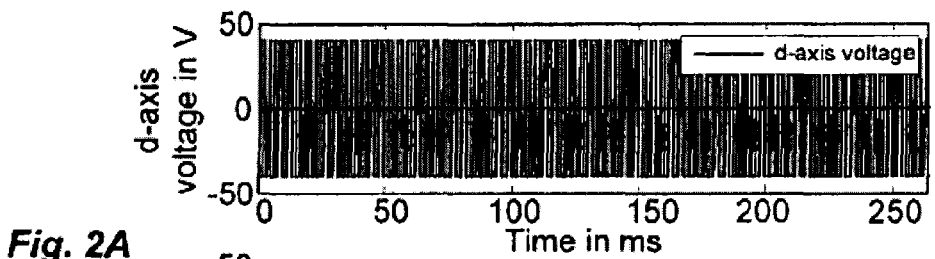
Figure 2A:
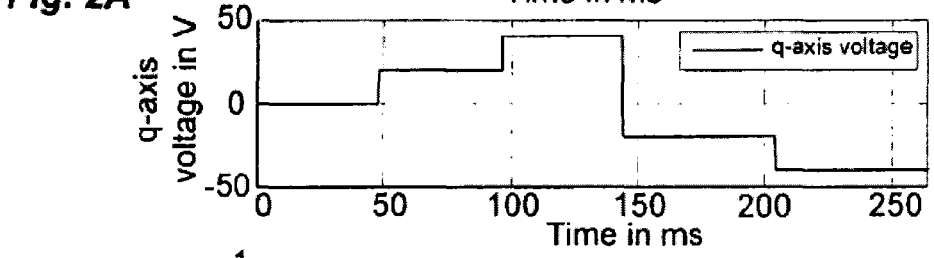

(51) Int. Cl.
*H02P 6/18* (2006.01)
*H02P 23/14* (2006.01)

(56) References Cited

U.S. PATENT DOCUMENTS

| | | | |
|---|---|---|---|
| 7,932,692 B2* | 4/2011 | Inokuma | 318/799 |
| 8,994,304 B2* | 3/2015 | Bae et al. | 318/400.02 |
| 9,007,004 B2* | 4/2015 | Hunter | 318/400.15 |
| 2004/0263114 A1 | 12/2004 | Kaneko et al. | |
| 2007/0132424 A1 | 6/2007 | Takao et al. | |
| 2011/0050140 A1 | 3/2011 | Sakai et al. | |

OTHER PUBLICATIONS

Reigosa, D. et al. "Measurement and Adaptive Decoupling of Cross-Saturation Effects and Secondary Saliencies in Sensorless-Controlled IPM Synchronous Machines", Industry Applications Conference, 2007. $42^{nd}$ IAS Annual Meeting. Conference Record of the 2007 IEEE, pp. 2399-2406, XP031146253, (Sep. 1, 2007).
International Search Report Issued May 17, 2013 in PCT/EP12/053428 Filed Feb. 29, 2012.

\* cited by examiner

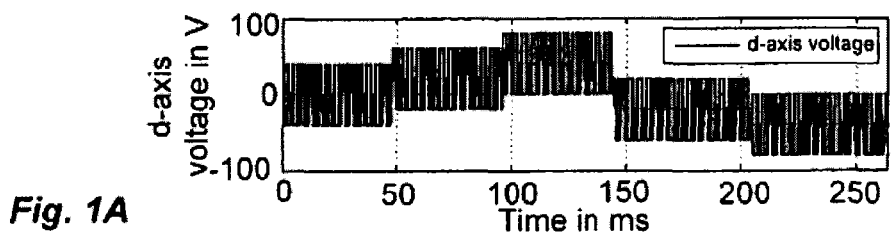
*Fig. 1A*
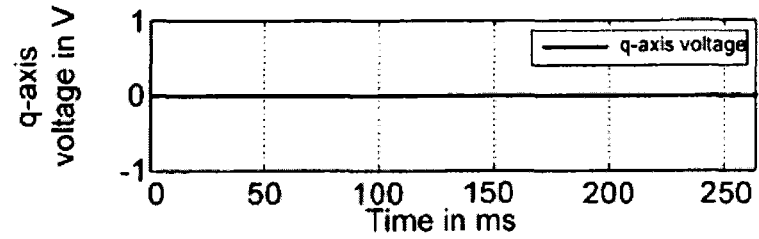
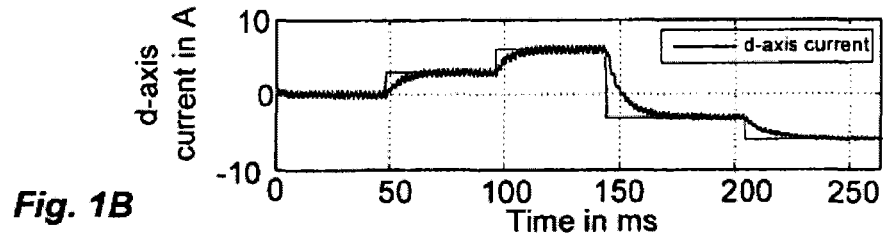
*Fig. 1B*
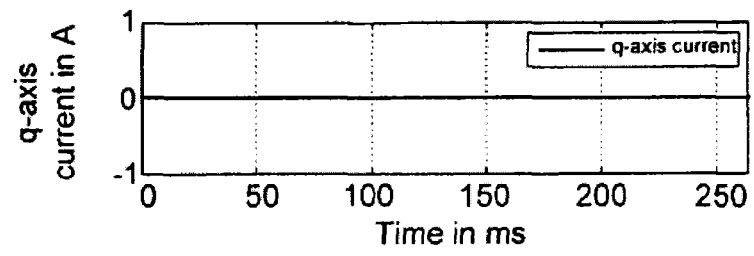
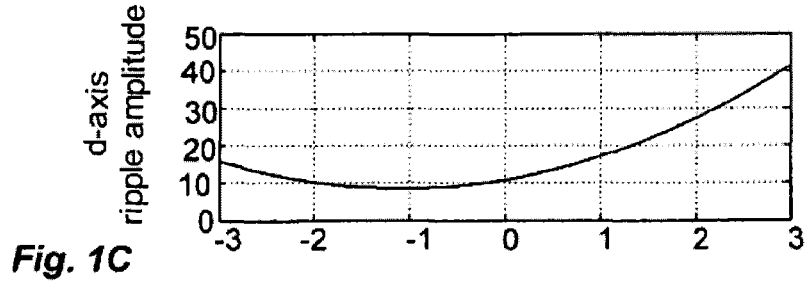
*Fig. 1C*
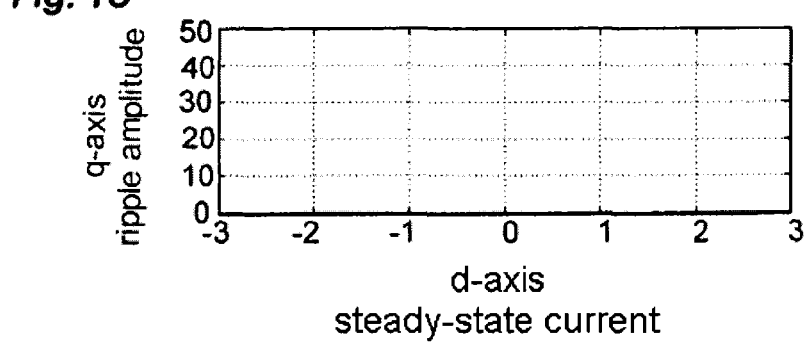
d-axis
steady-state current

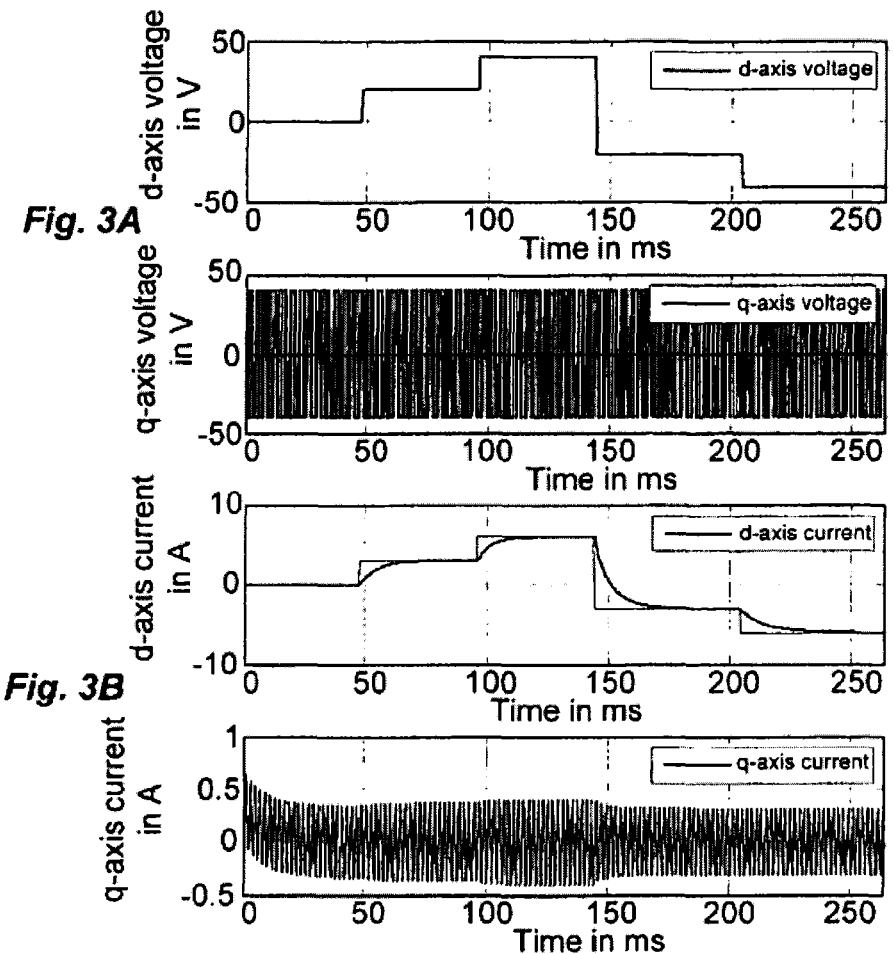
*Fig. 3A*
*Fig. 3B*
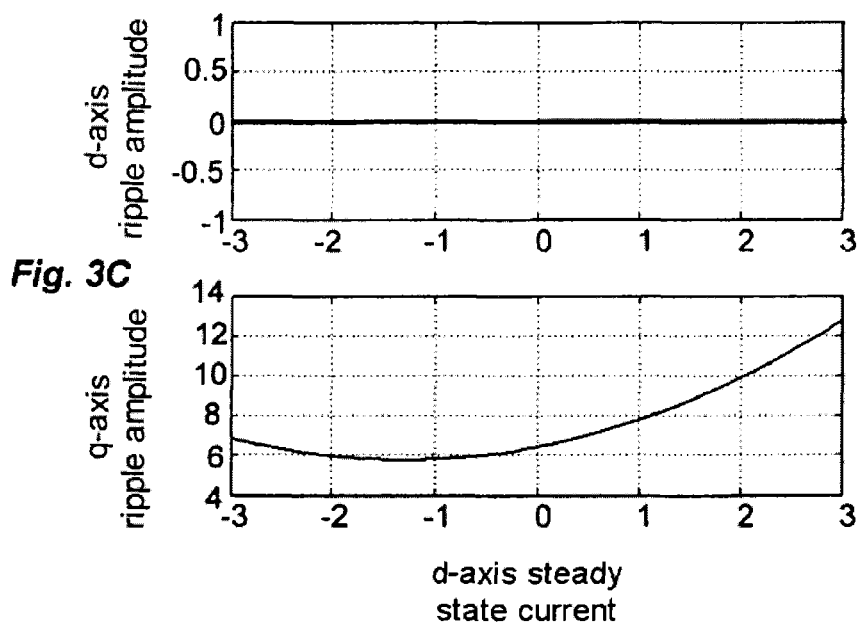
*Fig. 3C*

CONTROL METHOD IMPLEMENTED IN A POWER CONVERTER AND INTENDED FOR IDENTIFYING PARAMETERS LINKED TO THE MAGNETIC SATURATION OF AN ELECTRIC MOTOR

The present invention relates to a control method implemented in a power converter connected to a synchronous electric motor with permanent magnets and making it possible to identify parameters linked to the magnetic saturation of the electric motor. The method of the invention also makes it possible to employ said parameters in controlling the electric motor.

These days, in the power converters of variable speed drive type, the magnetic saturation is often not taken into account in the models of the electric motors employed to check or identify the parameters of the motor. In most of the current variable speed drives, there is, however, the possibility of setting a parameter with which to optimize the output torque in the case of magnetic saturation of the electric motor. This parameter corresponds to a default fixed angle correction applied in the execution of the control.

Document JP2010246318 describes a solution optimizing the torque in the case of magnetic saturation. This solution consists in correcting the flux current and the torque current by taking into account a curve of saturation as a function of the mutual inductance between the rotor and the stator. This document does not propose any solution with which to identify parameters linked to the magnetic saturation of the electric motor.

The publication entitled "*Measurement and Adaptative Decoupling of Cross Saturation Effects and Secondary Saliencies in Sensorless-Controlled IPM Synchronous Machines*" (David Reigosa et al.—XP031146253, ISBN :978-1-4244-1259-4) presents the effects of the magnetic saturation in synchronous machines. The method proposed in this document relies on neural networks. This method requires many computations and is therefore difficult to implement.

A method is known from the publication entitled "*Improved Rotor Position Estimation by Signal Injection Brushless AC Motors, Accounting for Cross-Coupling Magnetic Saturation*" (Li Y et al—XP031146247, ISBN : 978-1-4244-1259-4) with which to determine the influence of the mutual magnetic saturation ("cross-coupling") between the rotor and the stator of the motor. This method is applied to a brushless motor and cannot be adapted to a synchronous electric motor with permanent magnets. In practice, to be able to control a permanent magnet synchronous electric motor, it is necessary to characterize all the magnetic saturation phenomena, that is to say the mutual magnetic saturation between the stator and the rotor but also the intrinsic magnetic saturations of the rotor and of the stator.

The aim of the invention is to propose a simple and reliable control method for identifying parameters linked to the magnetic saturation of a permanent magnet synchronous electric motor, in order to use them subsequently to optimize the torque in the case of magnetic saturation. The method of the invention makes it possible to identify the parameters linked to the mutual magnetic saturation but also linked to the intrinsic saturation of the rotor and of the stator.

This aim is achieved by a control method implemented in a power converter comprising an inverter connected to a permanent magnet synchronous electric motor (M), said electric motor being modeled in the power converter by a mathematical model of the currents of the electric motor expressing a flux current and a torque current as a function of magnetic saturation parameters. The control method comprises:
   a step of application to the electric motor of a voltage sequence comprising a steady-state voltage signal and a high-frequency voltage signal along the axis of the flux and/or the axis of the torque of the motor, resulting in an oscillation of the current on the axis of the flux and/or on the axis of the torque,
   a step of measurement of the oscillation of the current obtained on the axis of the flux and/or on the axis of the torque,
   a step of determination of the magnetic saturation parameters as a function of said oscillation of the current.

To deduce the magnetic saturation parameters, the method implemented in the invention proves particularly simple because it requires only a basic computation. It is performed with the motor stopped and without using any position sensor. The voltages injected do not result in any rotation of the motor.

According to a particular feature, the step of determination of the magnetic saturation parameters comprises a step of extraction of the amplitude of the oscillation of the current obtained.

According to another particular feature, the step of determination of the magnetic saturation parameters comprises a step of estimation of said magnetic saturation parameters as a function of the amplitude of the oscillation of the current obtained.

According to another particular feature, the voltage sequence comprises:
   a step of application of a steady-state voltage signal on the axis of the torque and a high-frequency voltage signal on the axis of the flux, or
   a step of application of a steady-state voltage signal on the axis of flux and of a high-frequency voltage signal on the axis of the torque.

According to another particular feature, the mathematical model of the electric motor is of Hamilton-Lagrange type.

According to another particular feature, the method comprises a step of use of said saturation parameters to determine a correction to the angle error existing between the position of a control marker defined by the axis of flux and the axis of torque and a position of the rotor of the electric motor.

According to another particular feature, said correction is applied to the angle error. According to a variant embodiment, the correction is applied to a reference flux current and to a reference torque current determined as input for the control law.

The invention relates to a power converter comprising an inverter connected to a permanent magnet synchronous electric motor, said electric motor being modeled in the power converter by a mathematical model of the currents of the electric motor expressing a flux current and a torque current as a function of magnetic saturation parameters. The power converter comprises control meals arranged to apply to the electric motor a voltage sequence comprising a steady-state voltage signal and a high-frequency voltage signal along the axis of the flux and/or the axis of the torque of the motor, in order to cause an oscillation of the current on the axis of the flux and/or on the axis of the torque, means for measuring the oscillation of the current obtained on the axis of the flux and/or on the axis of the torque, means for determining the magnetic saturation parameters as a function of said oscillation of the current. This power converter is, for example, a variable speed drive.

Figure 4A:
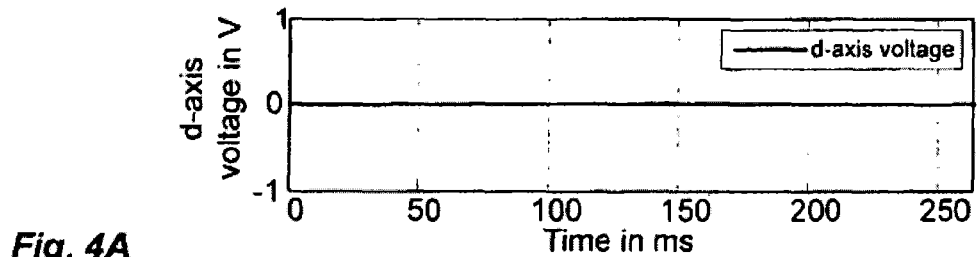
Figure 4B:
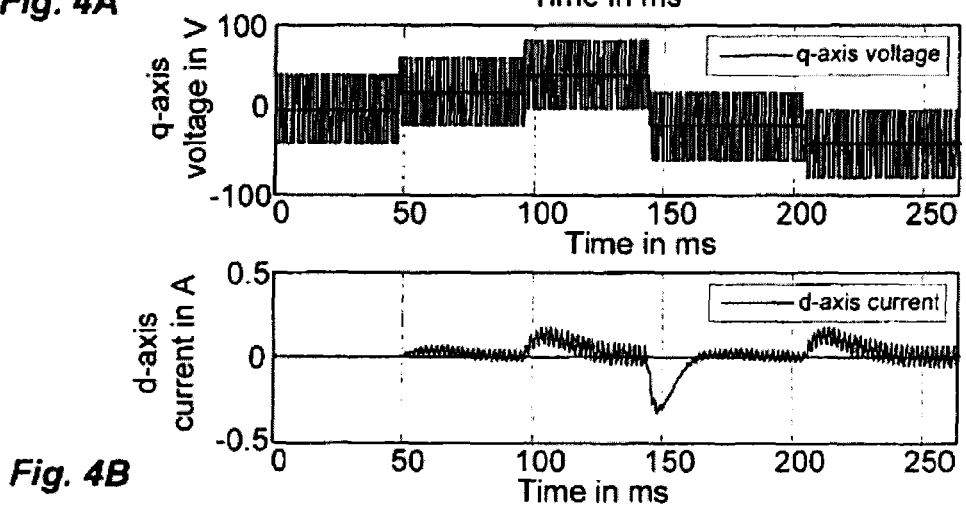
Figure 4C:
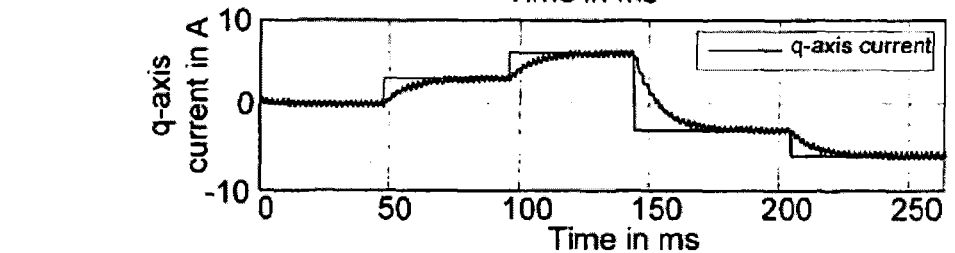
Figure 4C:
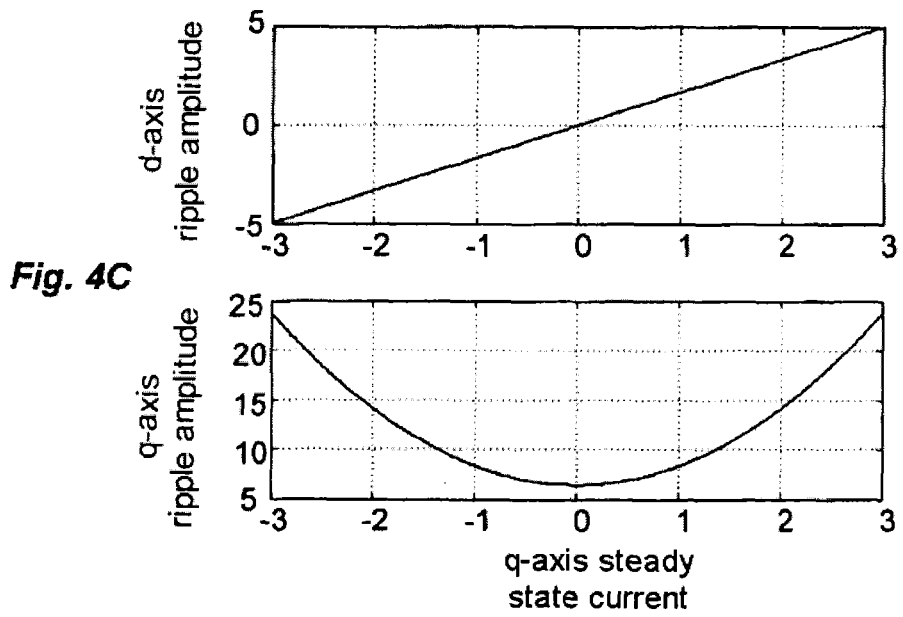
Figure 5A:
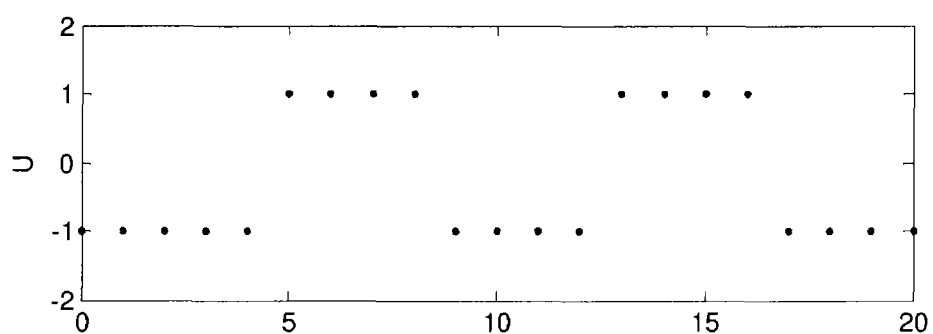
Figure 5B:
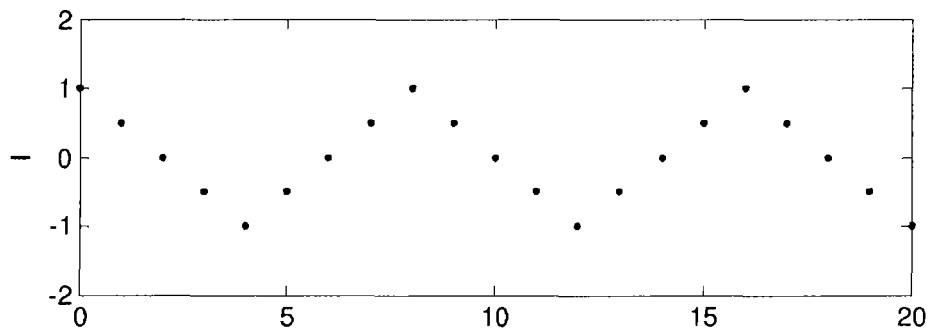
Figure 6:
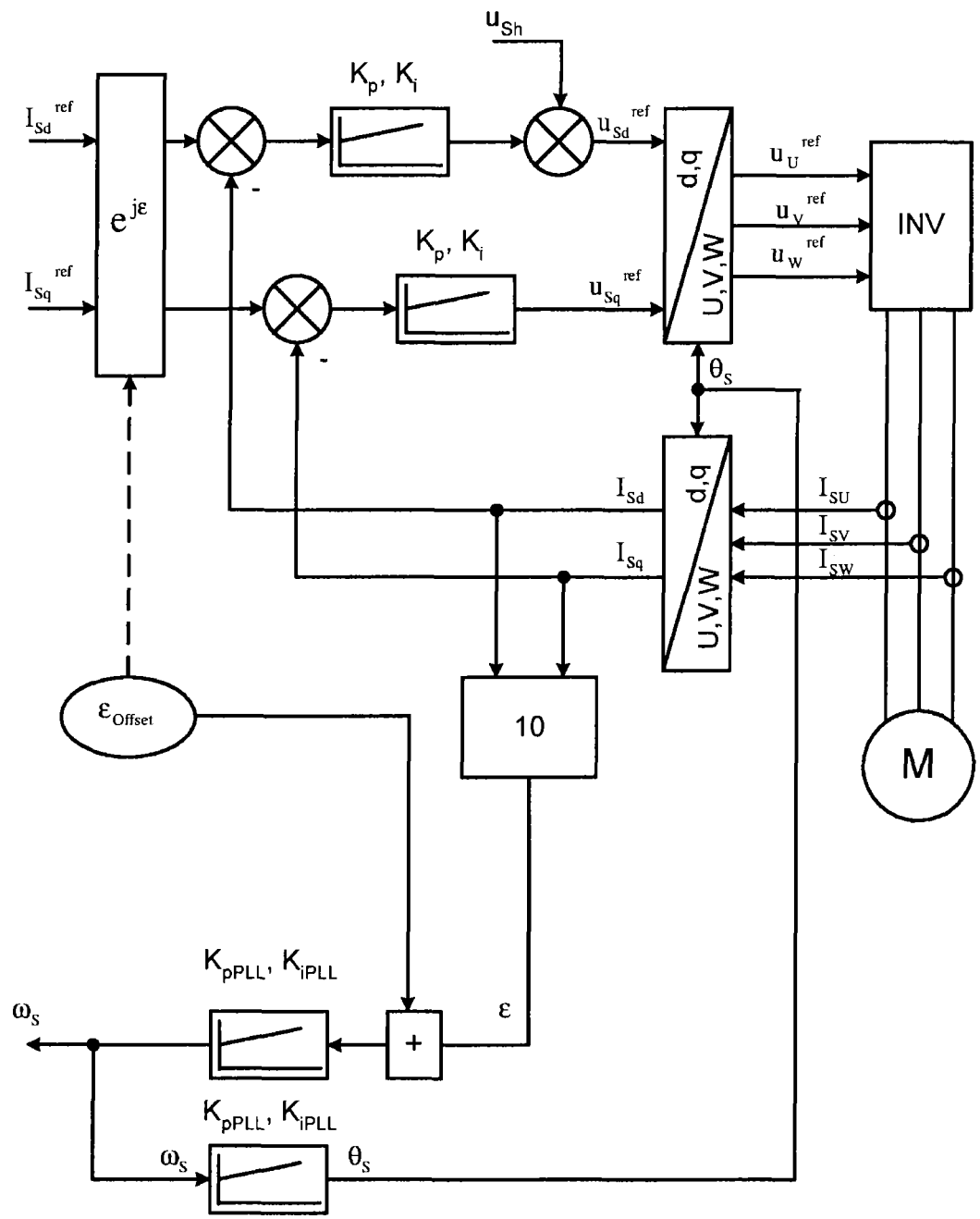

Other features and advantages will appear in the following detailed description with reference to an embodiment given as an example and represented by the appended drawings in which:

FIGS. 1A to 1C, 2A to 2C, 3A to 3C and 4A to 4C represent, in graph form, respectively, the voltage sequences applied making it possible to identify the parameters linked to the magnetic saturation of the electric motor, the current responses obtained and the expression of the amplitudes of the oscillations, FIGS. 5A and 5B give a simplified representation of an injection of a high-frequency voltage signal and the current oscillation obtained, FIG. 6 represents a control block diagram employing the parameters linked to the magnetic saturation of the electric motor.

The invention relates to a control method implemented in a power converter of variable speed drive type connected to a permanent magnet synchronous electric motor M (called "PMSM").

As is known, a power converter of variable speed drive type is connected upstream to an electrical network and downstream to the electric motor. The variable speed drive comprises:

- at the input, a rectifier module generally consisting of a diode bridge intended to rectify the alternating voltage supplied by the electrical network,
- a DC power supply bus to which is applied the voltage rectified by the rectifier module, the DC power supply bus being provided with a bus capacitor making it possible to maintain the bus voltage at a constant value,
- at the output, an inverter module INV intended to convert the DC bus voltage into a variable voltage to be applied to the electric motor M.

The inverter module INV is controlled by employing a determined control law executed by control means. The control law consists in computing the voltages to be applied to the electric motor as a function of a stator speed setpoint to be given to the electric motor.

FIG. 6 represents, in block diagram form, a control law that can be applied to an inverter module INV to control an electric motor M. According to the invention, this block diagram incorporates the recognition of the magnetic saturation of the electric motor and makes it possible to optimize the torque applied to the motor in the case of magnetic saturation of the electric motor.

To take account of the magnetic saturation in the control law, the invention consists in previously determining parameters $\alpha_{x,y}$ linked to the magnetic saturation of the electric motor. These parameters $\alpha_{x,y}$ are identified outside the normal operation of the variable speed drive, for example during a learning procedure.

According to the invention, some of these magnetic saturation parameters are employed to determine, during the normal operation of the motor, a correction of the angle error that exists between the position of the control marker (d and q axes) and the position of the rotor (that is to say, of the permanent magnet).

The invention consists first of all of a control method making it possible to determine the parameters $\alpha_{x,y}$ linked to the magnetic saturation of the electric motor. For this, a mathematical model of the permanent magnet synchronous electric motor, including the magnetic saturation, is used. In a Hamilton-Lagrange approach, the mathematical model of the permanent magnet synchronous electric motor, including the magnetic saturation phenomenon, follows, for example, the following expression:

$$H_{mS}(\psi_{Sd}, \psi_{Sq}) = \frac{\psi_{Sd}^2}{2 \cdot L_d} + \frac{\psi_{Sq}^2}{2 \cdot L_q} + \alpha_{3,0} \cdot \psi_{Sd}^3 + \alpha_{1,2} \cdot \psi_{Sd} \psi_{Sq}^2 + \alpha_{4,0} \cdot \psi_{Sd}^4 + \alpha_{2,2} \cdot \psi_{Sd}^2 \psi_{Sq}^2 + \alpha_{0,4} \cdot \psi_{Sq}^4 \quad (1)$$

From this expression, the following is deduced:

$$\frac{d}{dt}\psi_S = u_S - R_S \cdot I_S - j \cdot \omega \cdot (\psi_S + \varphi_m) \quad (2)$$

$$\frac{J}{n_p}\frac{d}{dt}\omega = \tau_{EM} - \tau$$

with $$I_S = 2\frac{\partial H_{mS}}{\partial \psi_S^*} = I_{Sd} + j \cdot I_{Sq} \quad (3)$$

$$I_{Sd} = \frac{\psi_{Sd}}{L_d} + 3 \cdot \alpha_{3,0} \cdot \psi_{Sd}^2 + \alpha_{1,2} \cdot \psi_{Sq}^2 + 4 \cdot \alpha_{4,0} \cdot \psi_{Sd}^3 + 2 \cdot \alpha_{2,2} \cdot \psi_{Sd}\psi_{Sq}^2$$

$$I_{Sq} = \frac{\psi_{Sq}}{L_q} + 2 \cdot \alpha_{1,2} \cdot \psi_{Sd}\psi_{Sq} + 2 \cdot \alpha_{2,2} \cdot \psi_{Sd}^2 \psi_{Sq} + 4 \cdot \alpha_{0,4} \cdot \psi_{Sq}^3$$

$$\tau_{EM} = np \cdot (I_{Sq} \cdot (\psi_{Sd} + \varphi_m) - I_{Sd} \cdot \psi_{Sq})$$

in which:
- $\Psi_S$: complex writing of the stator leakage flux $\Psi_{Sd}+j\cdot\Psi_{Sq}$,
- $\phi_m$: permanent flux,
- $\Psi_{Sd}$: d-axis stator leakage flux,
- $\Psi_{Sq}$: q-axis stator leakage flux,
- $L_d$: d-axis inductance,
- $L_q$: q-axis inductance,
- $u_S$: stator voltage,
- $R_S$: stator resistance,
- $I_S$: stator current,
- $\omega$: rotor speed (corresponding to $n_p \times$ mechanical speed),
- J: inertia,
- $n_p$: number of pairs of poles,
- $\tau_{EM}$: electromagnetic torque,
- $\tau$: motor torque,
- $\alpha_{x,y}$: magnetic saturation parameters.

The invention consists in identifying the magnetic saturation parameters referred to in the relationships written above. This mathematical model takes into account all the magnetic saturation types and effects of the electric motor, that is to say the mutual saturation between the stator and the rotor and the intrinsic saturation of the rotor and of the stator.

These parameters are therefore designated $\alpha^{3,0}$, $\alpha_{1,2}$, $\alpha_{4,0}$, $\alpha_{2,2}$, $\alpha_{0,4}$. To identify these parameters, the identification principle implemented by the control program of the invention consists in injecting two types of voltage signals on the axis of the flux (hereinbelow, d-axis) and/or on the axis of the torque (hereinbelow, q-axis). The first voltage signal is steady-state and the second voltage signal is at high frequency. The expression "steady-state signal" should be understood to mean a continuous signal over a certain duration, this steady-state signal being able to assume different levels over time.

FIGS. 1A, 2A, 3A and 4A show the injections of the voltage signals that make it possible to determine the magnetic saturation parameters. For each voltage signal injection, a current response $I_{Sd}$ is obtained on the d-axis and/or a current response $I_{Sq}$ is obtained on the q-axis enabling us to determine the saturation parameters. These current responses are represented in FIGS. 1B, 2B, 3B and 4B. This identification principle is explained by the following reasoning:

A voltage $u_s$ including a steady-state part and a high-frequency part is expressed as follows:

$$u_S = u_{Sd} + j \cdot u_{Sq} \text{ with } u_{Sd} = \bar{u}_{Sd} + \tilde{u}_{Sd} \cdot f(\Omega \cdot t), u_{Sq} = \bar{u}_{Sq} + \tilde{u}_{Sq} \cdot f(\Omega \cdot t)$$

in which $\bar{u}_S$ represents its steady-state part (on the d-axis or on the q-axis), $\tilde{u}_S$ represents its high-frequency part (on the d-axis or on the q-axis), f is a periodic function and F its centered primitive.

We thus obtain the expressions:
of the flux $$\psi_{Sd} = \bar{\psi}_{Sd} + \frac{\tilde{u}_{Sd}}{\Omega} \cdot F(\Omega \cdot t) + O\left(\frac{1}{\Omega^2}\right),$$

$$\psi_{Sq} = \bar{\psi}_{Sq} + \frac{\tilde{u}_{Sq}}{\Omega} \cdot F(\Omega \cdot t) + O\left(\frac{1}{\Omega^2}\right)$$

of the current $$I_{Sd} = \bar{I}_{Sd} + \tilde{I}_{Sd} \cdot F(\Omega \cdot t) + O\left(\frac{1}{\Omega^2}\right), \quad I_{Sq} = \bar{I}_{Sq} + \tilde{I}_{Sq} \cdot F(\Omega \cdot t) + O\left(\frac{1}{\Omega^2}\right)$$

in which, $\bar{I}_{Sd}$ and $\bar{I}_{Sq}$ represent the steady-state components of the flux and torque currents and $\tilde{I}_{Sd}$ and $\tilde{I}_{Sq}$ represent the oscillations of the flux and torque currents.

We obtain at first order in $\Omega$ and $\alpha$ (that is to say by using the relationships $\Psi_{Sd} \approx L_d \cdot I_{Sd}$ and $\Psi_{Sq} \approx L_q \cdot I_{Sq}$):

$$\Omega \cdot \tilde{I}_{Sd} = \frac{\tilde{u}_{Sd}}{L_d} + 6 \cdot \alpha_{3,0} \cdot L_d \cdot \bar{I}_{Sd} \cdot \tilde{u}_{Sd} + 2 \cdot \alpha_{1,2} \cdot L_q \cdot \bar{I}_{Sq} \cdot \tilde{u}_{Sq} + \quad (4)$$
$$2 \cdot \alpha_{2,2} \cdot L_q \cdot \bar{I}_{Sq} \cdot (2 \cdot L_d \cdot \bar{I}_{Sd} \cdot \tilde{u}_{Sq} + L_q \cdot \bar{I}_{Sq} \cdot \tilde{u}_{Sd}) +$$
$$12 \cdot \alpha_{4,0} \cdot L_d^2 \cdot \bar{I}_{Sd}^2 \cdot \tilde{u}_{Sd}$$

$$\Omega \cdot \tilde{I}_{Sq} = \frac{\tilde{u}_{Sq}}{L_q} + 2 \cdot \alpha_{1,2} \cdot (L_d \cdot \bar{I}_{Sd} \cdot \tilde{u}_{Sq} + L_q \cdot \bar{I}_{Sq} \cdot \tilde{u}_{Sd}) +$$
$$2 \cdot \alpha_{2,2} \cdot L_d \cdot \bar{I}_{Sd} \cdot (L_d \cdot \bar{I}_{Sd} \cdot \tilde{u}_{Sq} + 2 \cdot L_q \cdot \bar{I}_{Sq} \cdot \tilde{u}_{Sd}) +$$
$$12 \cdot \alpha_{0,4} \cdot L_q^2 \cdot \bar{I}_{Sq}^2 \cdot \tilde{u}_{Sq}$$

Since the current oscillations $\tilde{I}_{Sd}$ and $\tilde{I}_{Sq}$ can be extracted from the measurement of the currents $I_{Sd}$ and $I_{Sq}$, we obtain, through (4), relationships that make it possible to calculate the saturation parameters.

FIGS. 1A, 2A, 3A, 4A show four particular cases of injection of voltage signals (steady-state and high-frequency) on the d- and q-axes making it possible to extract the current oscillations $\tilde{I}_{Sd}$ and $\tilde{I}_{Sq}$ on the axis of the flux d and axis of the torque q.

In FIG. 1A, a steady-state voltage signal is applied to the d-axis and a high-frequency voltage signal is applied to the d-axis. FIG. 1B shows the corresponding current response.

Figure 2B:
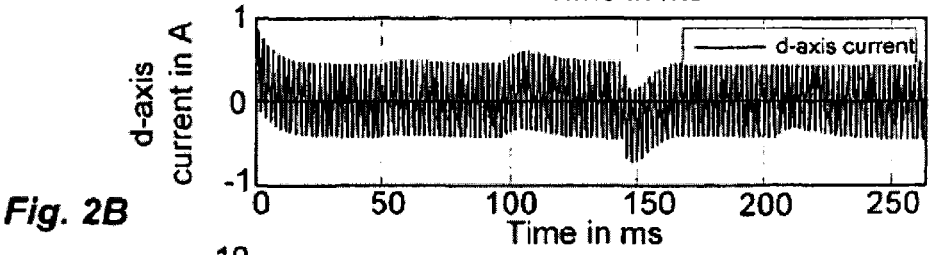
Figure 2B:
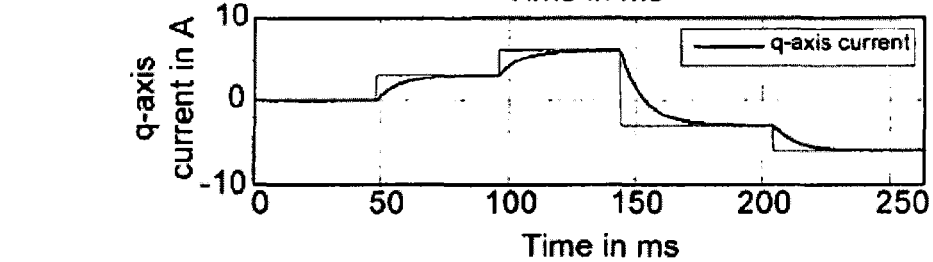
Figure 2C:
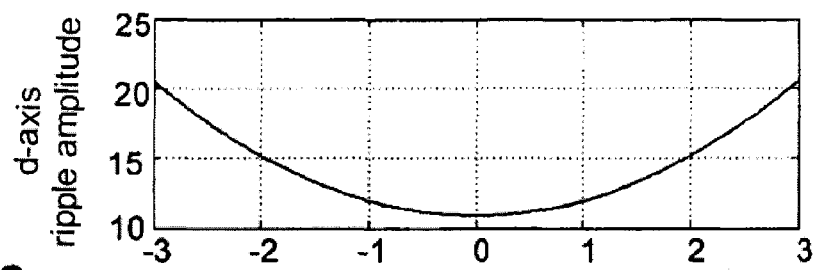
Figure 2C:
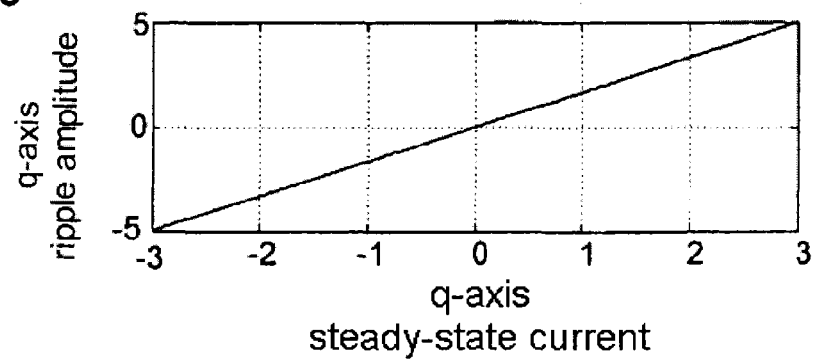

In FIG. 2A, a steady-state voltage signal is applied to the q-axis and a high-frequency voltage signal is applied to the d-axis. FIG. 2B shows the corresponding current response.

In FIG. 3A, a steady-state voltage signal is applied to the d-axis and a high-frequency voltage signal is applied to the q-axis. FIG. 3B shows the corresponding current response.

In FIG. 4A, a steady-state voltage signal is applied to the q-axis and a high-frequency voltage signal is applied to the q-axis. FIG. 4B shows the corresponding current response.

As represented in FIG. 5A, the high-frequency voltage signal can be a square wave signal. In this case, the current oscillations $\tilde{I}_{Sd}$ and $\tilde{I}_{Sq}$ obtained (FIG. 5B) are in the form of a triangular signal from which it is easy to extract the amplitudes in each period of the injection signal.

In FIGS. 1C, 2C, 3C and 4C, it can be seen that the amplitude of the oscillations of the current varies as a function of the level of the steady-state current obtained. These variations follow linear or quadratic relationships. A conventional least squares method then makes it possible to estimate the magnetic saturation parameters $\alpha_{x,y}$ designated above.

For example:
take the system $y = a \cdot x^2 + b \cdot x + c$, where a, b, c are parameters to be estimated and x, y known signals.

The estimation of the parameters a, b, c by the least squares is obtained by the matrix formulation:

$$\begin{bmatrix} \vdots \\ y_k \\ \vdots \end{bmatrix} = \begin{bmatrix} \vdots & \vdots & \vdots \\ x_k^2 & x_k & 1 \\ \vdots & \vdots & \vdots \end{bmatrix} \begin{bmatrix} a \\ b \\ c \end{bmatrix},$$

which supplies $$\begin{bmatrix} a \\ b \\ c \end{bmatrix} = inv\left(\begin{bmatrix} \vdots & \vdots & \vdots \\ x_k^2 & x_k & 1 \\ \vdots & \vdots & \vdots \end{bmatrix}^T \begin{bmatrix} \vdots & \vdots & \vdots \\ x_k^2 & x_k & 1 \\ \vdots & \vdots & \vdots \end{bmatrix}\right) \times \left(\begin{bmatrix} \vdots & \vdots & \vdots \\ x_k^2 & x_k & 1 \\ \vdots & \vdots & \vdots \end{bmatrix}^T \begin{bmatrix} \vdots \\ y_k \\ \vdots \end{bmatrix}\right),$$

or $$\begin{bmatrix} a \\ b \\ c \end{bmatrix} = inv\left(\begin{bmatrix} \sum x_k^4 & \sum x_k^3 & \sum x_k^2 \\ \sum x_k^3 & \sum x_k^2 & \sum x_k \\ \sum x_k^2 & \sum x_k & 1 \end{bmatrix}\right) \times \begin{bmatrix} \sum x_k^2 y_k \\ \sum x_k y_k \\ \sum y_k \end{bmatrix},$$

where $(y_k, x_k)$ are the measured data:
$y_k$: amplitude of the current oscillations for the test k,
$x_k$: value of the steady-state current for the test k.

Once the magnetic saturation parameters $\alpha_{x,y}$ have been determined, they can be used, during the normal operation of the motor, in the execution of the control law by the variable speed drive.

For that, the control law as represented in FIG. 6 is a little different from a standard control law since it includes the processing of the magnetic saturation of the motor.

The control law comprises a reference flux current $I_{Sd}^{ref}$ and a reference torque current $I_{Sq}^{ref}$, from which are determined a reference flux voltage $u_{Sd}^{ref}$ and a reference torque voltage $u_{Sq}^{ref}$. The reference flux voltage $u_{Sd}^{ref}$ has applied to it a high-frequency voltage signal $u_{Sh}$ making it possible to generate current oscillations on the flux axis d. From the reference flux voltage $u_{Sd}^{ref}$ and from the reference torque voltage $u_{Sq}^{ref}$ the control law generates the reference voltages $u_U^{ref}, u_V^{ref}, u_W^{ref}$ for the three phases U, V, W connecting the inverter INV to the motor M. As a function of the reference voltages $u_U^{ref}, u_V^{ref}, u_W^{ref}$, the inverter generates the corresponding voltages which create the currents $I_{SU}, I_{SV}, I_{SW}$ in the three phases U, V, W of the motor. These currents are measured and processed by the control law to convert them into flux and torque current, $I_{Sd}, I_{Sq}$ which are reinjected as input for regulation. From the measured flux and torque currents $I_{Sd}, I_{Sq}$, the control law calculates an angle error $\epsilon$ (block 10) corresponding to the difference between the position of the control marker (d- and q-axes) and the position of the rotor (that is to say, of the permanent magnet). To this angle error $\epsilon$, the control law adds a correction corresponding to the inclusion of the magnetic saturation. The duly corrected angle error then makes it possible to evaluate the stator speed by applying gains $K_p$ and $K_i$.

From a detailed point of view, when we write the motor model in the rotor marker when stopped, we obtain:

$$\frac{d}{dt}\psi_S = u_S - R_S \cdot I_S - j \cdot \omega_S \cdot (\psi_S + \varphi_m \cdot e^{j\varepsilon}) \tag{5}$$

with $\varepsilon$ being the angle error between the control marker and the position of the rotor $$I_S = (I'_{Sd} + jI'_{Sq}) \cdot e^{-j\varepsilon} \tag{6}$$

$$\psi_S = (\psi'_{Sd} + j\psi'_{Sq}) \cdot e^{-j\varepsilon}$$

$$I'_{Sd} = \frac{\psi'_{Sd}}{L_d} + 3 \cdot \alpha_{3,0} \cdot \psi'^2_{Sd} + \alpha_{1,2} \cdot \psi'^2_{Sq} + 4 \cdot \alpha_{4,0} \cdot \psi'^3_{Sd} + 2 \cdot \alpha_{2,2} \cdot \psi'_{Sd}\psi'^2_{Sq}$$

$$I'_{Sq} = \frac{\psi'_{Sq}}{L_q} + 2 \cdot \alpha_{1,2} \cdot \psi'_{Sd}\psi'_{Sq} + 2 \cdot \alpha_{2,2} \cdot \psi'^2_{Sd}\psi'_{Sq} + 4 \cdot \alpha_{0,4} \cdot \psi'^3_{Sq}$$

$$\tau_{EM} = np \cdot \mathrm{Im}(I_S \cdot (\psi_S + \varphi_m \cdot e^{-j\varepsilon})^*)$$

To the first order in $\varepsilon$, the equations (6) become:

$$I_{Sd} = \tag{7}$$

$$\begin{pmatrix} \frac{\psi_{Sq}}{L_d} - \frac{\psi'_{Sq}}{L_q} + 6 \cdot \alpha_{3,0} \cdot \psi_{Sd} \cdot \psi_{Sq} - 4 \cdot \alpha_{1,2} \cdot \psi_{Sd} \cdot \psi_{Sq} + 12 \cdot \alpha_{4,0} \cdot \\ \psi^2_{Sd} \cdot \psi_{Sq} + 2 \cdot \alpha_{2,2} \cdot \psi^3_{Sq} - 6 \cdot \alpha_{2,2} \cdot \psi^2_{Sd}\psi_{Sq} - 4 \cdot \alpha_{0,4} \cdot \psi^3_{Sq} \end{pmatrix} \cdot \varepsilon +$$

$$\left(\frac{\psi_{Sd}}{L_d} + 3 \cdot \alpha_{3,0} \cdot \psi^2_{Sd} + \alpha_{1,2} \cdot \psi^2_{Sq} + 4 \cdot \alpha_{4,0} \cdot \psi^3_{Sd} + 2 \cdot \alpha_{2,2} \cdot \psi_{Sd}\psi^2_{Sq}\right)$$

$$I_{Sq} = \begin{pmatrix} \frac{\psi_{Sd}}{L_d} - \frac{\psi_{Sd}}{L_q} + 3 \cdot \alpha_{3,0} \cdot \psi^2_{Sd} + 3 \cdot \alpha_{1,2} \cdot \psi^2_{Sq} - \\ 2 \cdot \alpha_{1,2} \cdot \psi^2_{Sd} + 12 \cdot \alpha_{0,4} \cdot \psi_{Sd} \cdot \psi^2_{Sq} - 2 \cdot \alpha_{2,2} \cdot \psi^3_{Sd} + \\ 6 \cdot \alpha_{2,2} \cdot \psi_{Sd}\psi^2_{Sq} + 4 \cdot \alpha_{4,0} \cdot \psi^3_{Sd} \end{pmatrix} \cdot \varepsilon +$$

$$\left(\frac{\psi_{Sq}}{L_q} + 2 \cdot \alpha_{1,2} \cdot \psi_{Sd}\psi_{Sq} + 4 \cdot \alpha_{0,4} \cdot \psi^3_{Sq} + 2 \cdot \alpha_{2,2} \cdot \psi^2_{Sd}\psi_{Sq}\right)$$

Let us define the voltage, with a voltage injection on the d-axis:

$$u_S = \overline{u}_{Sdq} + \tilde{u}_{Sd} \cdot f(\Omega \cdot t)$$

where $\overline{u}_{Sdq}$ is the voltage applied by a standard control.

It amounts to the basis of the relationship (5):

$$I_S = \overline{I}_S + \tilde{I}_S \cdot F(\Omega \cdot t) + O\left(\frac{1}{\Omega^2}\right) \tag{8}$$

$$\psi_S = \overline{\psi}_S + \frac{\tilde{u}_{Sd}}{\Omega} \cdot F(\Omega \cdot t) + O\left(\frac{1}{\Omega^2}\right)$$

where $\overline{\Psi}_S$ represents the part corresponding to the standard control.

Now we reinject the value of the flux (8) into the relationships (7) to isolate the oscillation of the current to the first order. We then obtain:

$$\tilde{I}_{Sd} = \tag{9}$$

$$(6 \cdot \alpha_{3,0} \cdot \psi_{Sq} - 4 \cdot \alpha_{1,2} \cdot \psi_{Sq} + 24 \cdot \alpha_{4,0} \cdot \psi_{Sd} \cdot \psi_{Sq} - 12 \cdot \alpha_{2,2} \cdot \psi_{Sd}\psi_{Sq}) \cdot$$

$$\frac{\tilde{u}_{Sd}}{\Omega} \cdot \varepsilon + \left(\frac{1}{L_d} + 6 \cdot \alpha_{3,0} \cdot \psi_{Sd} + 8 \cdot \alpha_{4,0} \cdot \psi^2_{Sd} + 2 \cdot \alpha_{2,2} \cdot \psi^2_{Sq}\right) \cdot \frac{\tilde{u}_{Sd}}{\Omega}$$

$$\tilde{I}_{Sq} = \begin{pmatrix} \frac{1}{L_d} - \frac{1}{L_q} + 6 \cdot \alpha_{3,0} \cdot \psi_{Sd} - 4 \cdot \alpha_{1,2} \cdot \psi_{Sd} + 12 \cdot \alpha_{0,4} \cdot \psi^2_{Sq} - \\ 6 \cdot \alpha_{2,2} \cdot \psi^2_{Sd} + 6 \cdot \alpha_{2,2} \cdot \psi^2_{Sq} + 12 \cdot a_{4,0} \cdot \psi^2_{Sd} \end{pmatrix} \cdot$$

$$\frac{\tilde{u}_{Sd}}{\Omega} \cdot \varepsilon + (2 \cdot \alpha_{1,2} \cdot \psi_{Sq} + 4 \cdot \alpha_{2,2} \cdot \psi_{Sd}\psi_{Sq}) \cdot \frac{\tilde{u}_{Sd}}{\Omega}$$

In the case of magnetic saturation, without current injection on the flux axis d, the angle error $\varepsilon$ can be expressed as a function of the oscillation of the current and of a correction making it possible to optimize the torque produced. We then obtain:

$$\tilde{I}_{Sq} = \frac{1}{L} \cdot \frac{\tilde{u}_{Sd}}{\Omega} \cdot \varepsilon + \tilde{I}_{SqOffset} \tag{10}$$

with $$\frac{1}{L} = \frac{1}{L_d} - \frac{1}{L_q} + (6 \cdot \alpha_{3,0} - 4 \cdot \alpha_{1,2}) \cdot L_d \cdot I_{Sd} +$$

$$(12 \cdot \alpha_{0,4} + 6 \cdot \alpha_{2,2}) \cdot L^2_q \cdot I^2_{Sq} + (12 \cdot \alpha_{4,0} - 6 \cdot \alpha_{2,2}) \cdot L^2_d \cdot I^2_{Sd}$$

$$\tilde{I}_{SqOffset} = (2 \cdot \alpha_{1,2} + 4 \cdot \alpha_{2,2} \cdot L_d \cdot I_{Sd}) \cdot L_q \cdot I_{Sq} \cdot \frac{\tilde{u}_{Sd}}{\Omega}$$

The relationship (10) can thus be rewritten as follows:

$$\frac{L \cdot \Omega \cdot \tilde{I}_{Sq}}{\tilde{u}_{Sd}} = \varepsilon + \frac{L \cdot \Omega \cdot \tilde{I}_{SqOffset}}{\tilde{u}_{Sd}} = \varepsilon + \varepsilon_{Offset}$$

in which $\varepsilon_{Offset}$ corresponds to the correction to the angle error to be taken into account in the case of magnetic saturation of the electric motor, this correction being a function of the magnetic saturation parameters $\alpha_{1,2}$ and $\alpha_{2,2}$. It is interesting to note that the knowledge only of these two parameters is sufficient to determine the correction to be applied. The principle of identification of the parameters described above could therefore be limited to just these parameters.

In FIG. 6, it can be seen that the determined correction $\varepsilon_{Offset}$ can be injected directly onto the angle error $\varepsilon$ or applied as input to correct the reference flux current $I_{Sd}^{ref}$ and the reference torque current $I_{Sq}^{ref}$. The control law structure thus makes it possible to regulate the angle error $\varepsilon$ to zero even in the case of magnetic saturation of the electric motor.

The torque obtained from the torque current and from the angle $\varepsilon$ is $\tau_{EM} = np \cdot I_{Sq} \cdot \phi_m \cdot \cos(\varepsilon)$. The current consumed to supply a given torque is minimal when the angle $\varepsilon$ is zero.

The invention claimed is:

1. A control method implemented in a power converter comprising an inverter connected to a permanent magnet synchronous electric motor comprising a rotor and a stator, the electric motor being modeled in the power converter by a mathematical model of currents of the electric motor expressing a flux current and a torque current as a function of magnetic saturation parameters, representative of mutual magnetic saturation between the rotor and the stator of the electric motor and of intrinsic magnetic saturation of the rotor and of the stator, the control method comprising:

application to the electric motor of a voltage sequence comprising a steady-state voltage signal and a high-frequency voltage signal along an axis of the flux and/or an axis of torque of the motor, resulting in an oscillation of current on the axis of the flux and/or on the axis of the torque;

measurement of the oscillation of the current obtained on the axis of the flux and/or on the axis of the torque;

determination of the magnetic saturation parameters as a function of the oscillation of the current.

2. The method as claimed in claim 1, wherein the determination of the magnetic saturation parameters comprises extraction of amplitude of the oscillation of the current obtained.

3. The method as claimed in claim 2, wherein the determination of the magnetic saturation parameters comprises estimation of the magnetic saturation parameters as a function of the amplitude of the oscillation of the current obtained.

4. The method as claimed in claim 1, wherein the voltage sequence comprises:

application of a steady-state voltage signal on the axis of the torque and a high-frequency voltage signal on the axis of the flux; or application of a steady-state voltage signal on the axis of the flux and of a high-frequency voltage signal on the axis of the torque.

5. The method as claimed in claim 1, wherein the mathematical model of the electric motor is of Hamilton-Lagrange type.

6. The method as claimed in claim 1, further comprising use of the saturation parameters to determine a correction to an angle error existing between a position of a control marker defined by the axis of flux and the axis of torque and a position of the rotor of the electric motor.

7. The control method as claimed in claim 6, wherein the correction is applied to the angle error.

8. The control method as claimed in claim 6, wherein the correction is applied to a reference flux current and to a reference torque current determined as an input for the control law.

9. A power converter comprising:

an inverter connected to a permanent magnet synchronous electric motor which comprises a rotor and a stator, the electric motor being modeled in the power converter by a mathematical model of currents of the electric motor expressing a flux current and a torque current as a function of magnetic saturation parameters, representative of mutual magnetic saturation between the rotor and the stator of the electric motor and of intrinsic magnetic saturation of the rotor and of the stator;

control means configured to apply to the electric motor a voltage sequence comprising a steady-state voltage signal and a high-frequency voltage signal along an axis of the flux and/or an axis of the torque of the motor, to cause an oscillation of the current on the axis of the flux and/or on the axis of the torque;

means for measuring the oscillation of the current obtained on the axis of the flux and/or on the axis of the torque; and means for determining the magnetic saturation parameters as a function of the oscillation of the current.

10. The power converter as claimed in claim 9, of variable speed drive type.

* * * * *